(12) United States Patent
Wambsganss (10) Patent No.: US 9,973,097 B2
(45) Date of Patent: May 15, 2018

(54) REGULATING TRANSFORMER RECTIFIER UNIT WITH MULTIPLE CIRCUITS FOR PREVENTING OUTPUT OVERVOLTAGE

(71) Applicant: Astronics Advanced Electronic Systems Corp., Kirkland, WA (US)

(72) Inventor: Warren J. Wambsganss, Snoqualmie, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days. days.

(21) Appl. No.: 15/188,723

(22) Filed: Jun. 21, 2016

(65) Prior Publication Data

US 2017/0366093 A1    Dec. 21, 2017

(51) Int. Cl.
| | | |
|---|---|---|
| *H02M 3/335* | (2006.01) | |
| *B64D 47/00* | (2006.01) | |
| *H02M 1/08* | (2006.01) | |
| *H02M 1/36* | (2007.01) | |
| *H02M 1/42* | (2007.01) | |
| *H02M 1/44* | (2007.01) | |
| *H02M 7/04* | (2006.01) | |
| *H02M 1/00* | (2006.01) | |

(52) U.S. Cl.
CPC ........ *H02M 3/33546* (2013.01); *B64D 47/00* (2013.01); *H02M 1/08* (2013.01); *H02M 1/36* (2013.01); *H02M 1/4241* (2013.01); *H02M 1/44* (2013.01); *H02M 7/04* (2013.01); *H02M 2001/0009* (2013.01)

(58) Field of Classification Search
CPC ...... H02M 3/33546; H02M 1/08; H02M 1/36; H02M 1/4241; H02M 1/44; H02M 7/04; H02M 2001/0009

See application file for complete search history.

(56) References Cited

U.S. PATENT DOCUMENTS

| | | |
|---|---|---|
| 4,739,466 A | 4/1988 | Glennon et al. |
| 4,866,591 A | 9/1989 | Cook et al. |
| 6,256,213 B1 | 7/2001 | Illingworth |
| 7,796,413 B2 | 9/2010 | Furmanczyk |
| 8,493,754 B1 | 7/2013 | Wambsganss et al. |
| 8,687,394 B2 | 4/2014 | Cottingham et al. |
| 9,042,125 B1 | 5/2015 | Wambsganss |
| 2003/0128563 A1* | 7/2003 | Rojas Romero .... H02M 1/4216 363/89 |

(Continued)

OTHER PUBLICATIONS

Qiong Wang, et al, Design and Optimization of a Higher Performance Isolated Three-Phase AC/DC Converter, Center for Powered Electronics Systems—Presented at CPES Apr. 2016.

*Primary Examiner* — Kyle J Moody
*Assistant Examiner* — Lakaisha Jackson
(74) *Attorney, Agent, or Firm* — Wiggin and Dana LLP; Gregory S. Rosenblatt; Abraham Kasdan (57) ABSTRACT

A power supply system and related method for providing a regulated DC output from an unregulated AC input includes a Vienna rectifier having power factor correction circuitry and a series resonant DC to DC converter to provide a regulated DC output. The power supply system further includes one or more compensator circuits coupled in feedback configuration to control the Vienna rectifier and/or the DC to DC converter and avoid a potentially dangerous over-voltage condition at the regulated DC output.

8 Claims, 3 Drawing Sheets

(56) References Cited

U.S. PATENT DOCUMENTS

| | | | |
|---|---|---|---|
| 2007/0008745 A1* | 1/2007 | Joshi | H02M 3/1588 |
| | | | 363/21.01 |
| 2013/0343102 A1* | 12/2013 | Bhatt | H02M 5/225 |
| | | | 363/37 |
| 2014/0147134 A1* | 5/2014 | Verheijen | G03G 15/0291 |
| | | | 399/31 |

* cited by examiner

REGULATING TRANSFORMER RECTIFIER UNIT WITH MULTIPLE CIRCUITS FOR PREVENTING OUTPUT OVERVOLTAGE

FIELD OF THE DISCLOSURE

The present disclosure generally relates to power supply systems and methods for providing regulated DC power for various applications from an AC source, including in particular the supply of DC power in an aircraft environment.

BACKGROUND OF THE DISCLOSURE

Traditionally, DC power on board aircraft has been derived from three-phase AC power provided by on-board generators, using a Transformer Rectifier Unit (TRU) or an Autotransformer Rectifier Unit (ATRU). Aspects of exemplary prior art systems are described in, for example, U.S. Pat. Nos. 4,866,591, 4,739,446, 6,256,213, 7,796,413, and 8,687,394. The output of the on-board generators, which are driven by the aircraft engines, is typically 115 VAC three phase power at nominally 400 Hz. However, the frequency may vary widely depending on engine conditions (e.g., in the range of 300-800 Hz). The TRU converts this unregulated frequency, three phase voltage into regulated DC power to supply various on board systems.

The traditional prior art TRU employs a relatively large line frequency transformer (nominally operating at 400 Hz) to provide galvanic isolation. Typically, the transformer creates additional phases from the unregulated three phase AC input. In such traditional TRU, the multiple phases appearing at the output of the transformer are each provided to a set of silicon rectifiers that rectify the power to provide a DC output voltage, e.g., 28V DC.

To some extent, the harmonic currents created by the rectifiers may be cancelled in the transformer by synthesis of additional phases in the transformer windings. For example, if three additional phases are synthesized by the transformer windings for a total of six phases, (three original phases plus three more), then for each line cycle, the output diodes will conduct 12 times, resulting in a 12-pulse TRU. (Other pulse count TRUs may be constructed by synthesizing different numbers of additional phases).

Typically, the higher the pulse count, the more harmonics will be cancelled to provide a current waveform that more closely resembles a sine wave. However, these types of traditional TRU units lack good regulation, and are not effective at rejecting transient voltages that may appear at their inputs.

To address this problem, some aerospace power system suppliers have replaced the output rectifiers with silicon-controlled rectifiers (SCRs) and incorporate designs that control the conduction phase angle of the SCRs to regulate the DC output voltage. Such units are commonly referred to as Regulating Transformer Rectifier Units (R-TRUs).

However, traditional TRU and R-TRU units suffer from multiple drawbacks. For example, they require a relatively large 400 Hz line frequency transformer that, in an aircraft environment, takes up valuable space and increases weight. They also exhibit relatively poor energy conversion efficiency due to the high voltage drop that occurs in their output rectifiers. For example, prior art R-TRU designs typically do not provide more than approximately 85% efficiency.

Of particular importance to aircraft power distribution systems is protection against damaging failure modes. For example, an over-voltage at the DC output has the potential of creating a hazardous condition on the aircraft, by either damaging critical downstream load equipment so that the equipment no longer functions, damaging redundant equipment due to an over-voltage condition that crosses between redundant power busses, or causing smoke and fire due to damage to equipment that can lead to failure of critical aircraft systems. In a worst case scenario, such damage can result in catastrophic failure of the aircraft itself.

Traditional R-TRUs may be subject to various failure modes that can cause a dangerous over-voltage condition. Prior art systems incorporating traditional R-TRUs therefore must include auxiliary safety circuits that prevent over-voltage, leading to additional expense and size of such systems. Accordingly, there is a need in this field for more efficiency power systems that provide good regulation of the DC output, and that also provide built-in safeguards to prevent over-voltage conditions from damaging the aircraft or downstream systems.

To overcome the failings of prior art designs, the disclosed system utilizes a high frequency switching power conversion architecture that provides a regulated DC power system that is small in size, highly efficient in terms of energy conversion, and that incorporates multiple layers of protection against damaging over-voltage conditions.

Efficiencies using the circuit topologies disclosed herein can be 30% above prior art designs, e.g., in the approximate range of 96-98%, and may provide DC power systems capable of outputting 7-10 KW or more, typically providing 28 V DC output voltages and capable of providing 100-400 A current outputs.

In accordance with one aspect of the present disclosure, an R-TRU having the foregoing advantages of small size and high efficiency is provided to convert a three phase AC input voltage into a regulated DC output voltage, by utilizing a Vienna Rectifier have power factor correction circuitry for actively increasing the power factor towards unity.

In accordance with another aspect of the present disclosure the Vienna Rectifier is coupled to a DC to DC converter, which in a preferred embodiment is a series resonant DC to DC converter whose output may be controlled using phase shift modulation control over its duty cycle.

In accordance with yet another aspect of the present disclosure, one or more compensator circuits are provided in feedback arrangements that are coupled to the Vienna Rectifier and/or the DC to DC converter to control their respective outputs and prevent a damaging over-voltage condition from appearing at the regulated DC output.

BRIEF DESCRIPTION OF THE DRAWINGS

The foregoing aspects, and other advantages and benefits of the embodiments and circuit arrangements disclosed herein will become apparent from the following more detailed description, which may be understood with reference to the attached drawings, in which like designations refer to like elements, and wherein.

DETAILED DESCRIPTION OF AN EXEMPLARY EMBODIMENT

Figure 1:
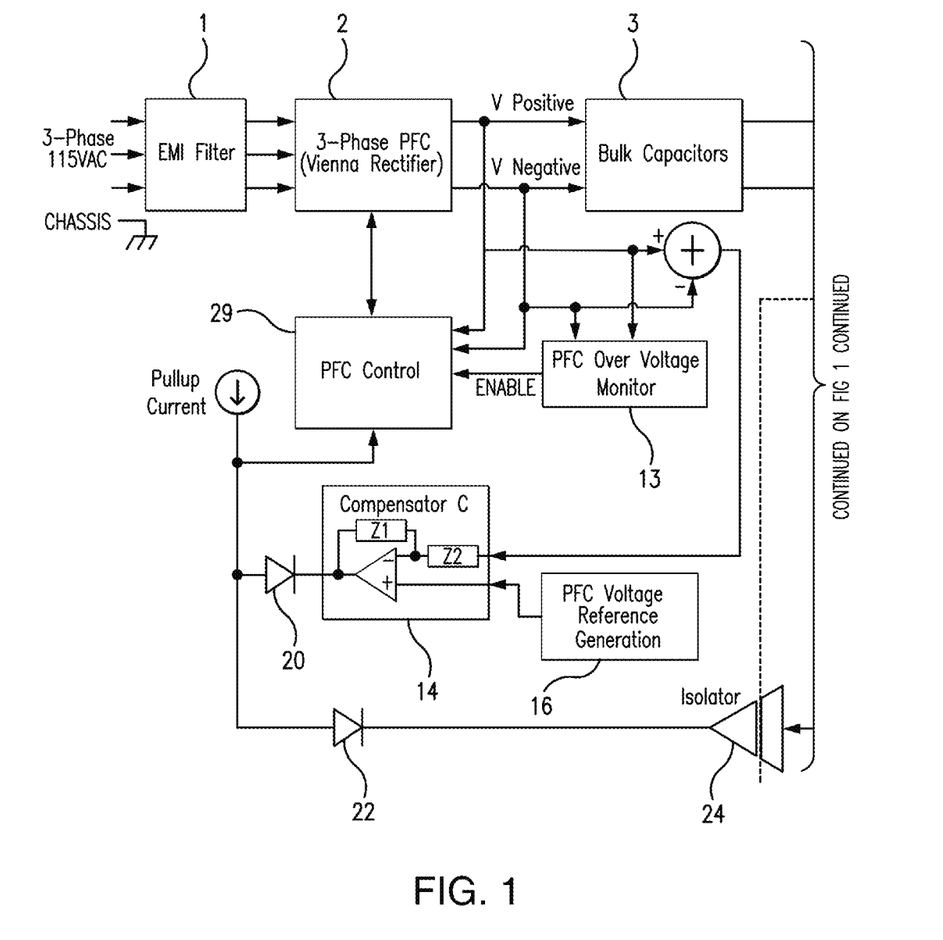
FIG. 1 is a system block diagram showing an exemplary embodiment of the improved R-TRU disclosed herein.

An exemplary embodiment is described herein with reference to the system block diagram depicted in FIG. 1. As used herein and in the claim language, terms such as "coupled to" or "connected to" shall be broadly interpreted to mean elements that are coupled or connected to other elements either directly or through intervening elements. The more restrictive term "couple directly to" or "connected directly to" will be used to describe couplings or connections that exclude intervening elements.

Referring to FIG. 1, unregulated three-phase AC power from, for example, an aircraft's generators, is first connected to an EMI (electromagnetic interference) filter 1. As mentioned above, the frequency of the input voltage may vary over a wide range (e.g., 300-800 Hz). EMI filter 1 attenuates RF voltage/currents at the three-phase power input and prevents them from propagating both downstream as well as upstream.

Figure 2A:
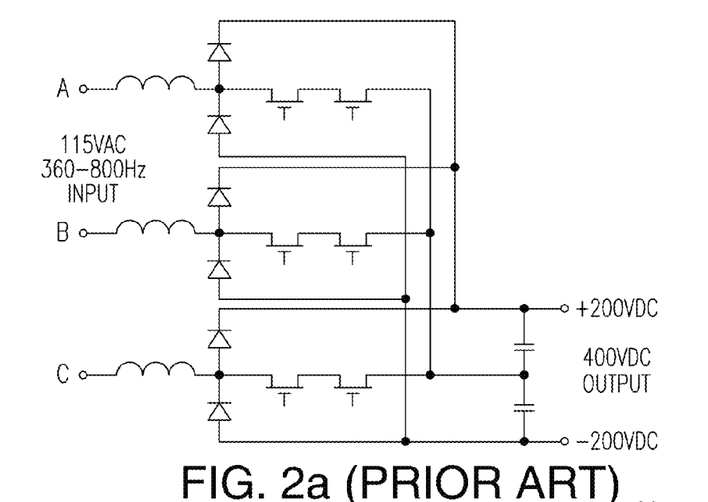
FIG. 2*a* is a top level circuit diagram showing features of a Vienna Rectifier that may be used in the FIG. 1 embodiment.

In the exemplary embodiment of FIG. 1, the EMI-filtered voltage at the output of EMI filter 1, is coupled to a three phase Vienna Rectifier 2. Vienna Rectifier 2 is a known rectifier topology that incorporates power factor control (PFC) circuitry to increase the power factor of the rectifier as closely as possible to unity. This increases overall system efficiency by reducing power dissipation caused by mismatch of voltage/current phases at the power input of the rectifier. Power factor control in a Vienna Rectifier is accomplished by actively controlling the input side of the rectifier to draw sinusoidal current from the three phase power input, thereby providing near unity power factor. The DC output of the Vienna Rectifier 2 may typically be controlled in the range of +/−190 VDC to +/−400 VDC, depending on the input AC voltage range. FIG. 2a shows a top level schematic of a Vienna Rectifier topology in which the power factor is actively controlled by FET switches.

While a Vienna Rectifier 2 is used in the FIG. 1 embodiment, other rectifiers that include PFC circuits to control and increase the power factor between input and output may be used, e.g., a three phase six-switch PFC Rectifier well known in the art, or other lesser known PFC rectifier topologies.

As shown, the Vienna Rectifier 2 in the exemplary embodiment of FIG. 1 produces a high voltage rail at its output that may nominally be +/−200 VDC. As shown in FIG. 1, this DC output is coupled to one or more bulk capacitors in circuit block 3 to reduce ripple currents from entering the next stage and to stabilize the DC bus. Such ripple currents are produced by the Vienna Rectifier front end and also may include line frequency ripple. Because of the three phase AC input, the value of the capacitor(s) may be significantly lower than for a single phase AC input. Common capacitance values may be in the range of 100 microfarads to 500 microfarads for multi-kilowatt converters.

In FIG. 1, the filtered output from block 3 is connected to a Resonant DC-DC converter 5. The Resonant DC/DC Converter 5 converts the high voltage DC on its input to a galvanically isolated, lower voltage DC on its output.

For aircraft applications, the DC output voltage may typically be +28V DC, +/−135V DC, or +270V DC. The Resonant DC/DC Converter 5 has limited regulation capability, per se. The Resonant DC/DC Converter voltage gain may be in the range of 0V/V to Ns/Np V/V, where Ns is the number of secondary turns in the DC/DC transformer and Np is the number of primary turns in the DC/DC transformer.

In operation, the voltage gain of the Resonant DC/DC Converter 5 is purposely limited in order to provide maximum efficiency and to prevent it from being capable of causing an over-voltage condition in the case of a failure.

Figure 2B:
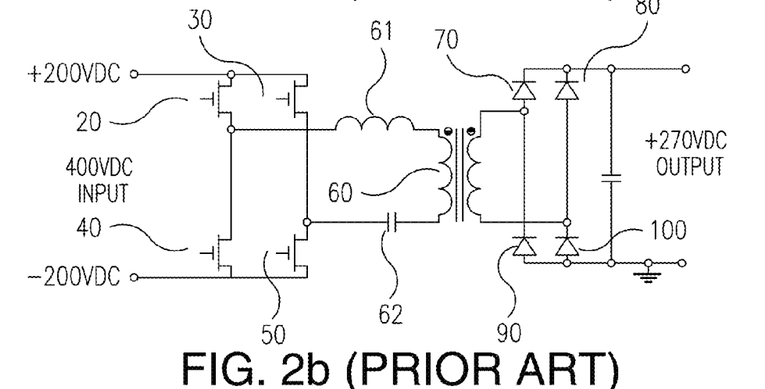
FIG. 2*b* is a top level circuit diagram showing the features of a series resonant DC to DC converter that may be used in the FIG. 1 embodiment to provide a 270 V DC output.
Figure 2C:
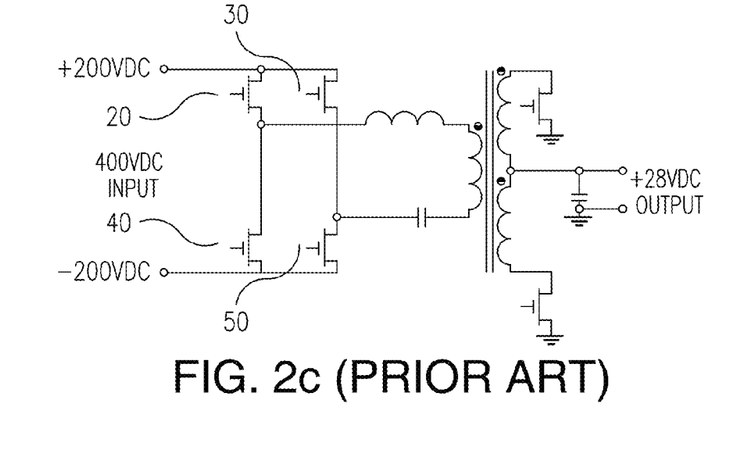
FIG. 2*c* is a top level circuit diagram showing the features of a series resonant DC to DC converter that may be used in the FIG. 1 embodiment to provide a 28 V DC output, and which uses switching FETs instead of diodes to generate the DC output.

In the exemplary FIG. 1 embodiment, the Resonant DC/DC Converter 5 is a phase shift-modulated, full-bridge series resonant DC-DC converter driven at or near its resonant frequency (e.g., 120 kHz). The key components of this topology are illustrated in FIGS. 2b and 2c.

There are numerous advantages gained by using this type of DC/DC Converter architecture in an R-TRU. First, by using a phase shift modulated full-bridge series resonant converter (SRC), one has the ability to very precisely limit the output voltage rise time as well as the inrush current demanded by load equipment, providing good "soft start" characteristics.

Other topologies, such as a frequency modulated LLC converter known in the art, do not provide good control of output voltage rise and output current during soft start. For example, if a highly capacitive load were to be connected to the output of other converter designs, e.g., a frequency-modulated LLC converter, the resulting large in-rush current may produce excessive current stress in its switching power FETs, as well as voltage stress on the resonant capacitor, making a full-bridge series resonant converter better suited for the power distribution systems described herein.

Other topologies, such as a frequency-modulated, half-bridge LLC converter, are also not capable of precisely regulating the output current during a short circuit. If a short circuit occurs on the output, the switching frequency may be increased within the capabilities of the power FETs, but the output current can still reach levels high enough to create significant, and potentially damaging current stress in the power FETs and voltage stress on the resonant capacitor.

Further, for power distribution equipment, such as an R-TRU, the output must regulate elevated short circuit current into a faulted load long enough to trip a circuit breaker, which may take up to 5 seconds, or longer, to occur. This makes other converter topologies, such as a half-bridge LLC converter, unsuitable for such power distribution applications.

On the other hand, a phase shift-modulated full bridge SRC topology, as used herein, permits precise regulation of current during overload conditions to prevent damage to the R-TRU electronics, but still trip individual breakers within the power distribution network so that the other load equipment may continue to operate.

Still further, other topologies, depending on loading conditions, may produce very high output voltages if the control is faulted. This characteristic of, for example, a half-bridge LLC resonant converter, makes it possible for such other topologies to create a damaging failure condition, which could create a hazardous condition due to excessively high voltage on the aircraft power distribution bus. On the other hand, the series resonant converter topology used herein is not capable of creating an elevated output voltage, but rather can only reduce the output voltage in the event of a fault condition.

Yet another advantage of using a series resonant converter is reduced switching losses, since such resonant converters are able to switch at zero-current and zero-voltage conditions.

It should be noted however, that while a phase shift-modulated full bridge series resonant DC-DC converter having the foregoing advantages is used in the exemplary embodiment of FIG. 1, other DC/DC converters having different topologies may also be used without departing from the spirit of the invention, as described by all of the disclosed features.

As shown in FIG. 1, the output of the Resonant DC/DC Converter 5 is coupled to an Output Filter 8, which filters the Converter's output to reduce voltage ripple at DC Output 26 and to aid in providing EMI/EMC compliance.

FIG. 2b shows an example of the basic topology of the Resonant DC/DC Converter 5 that may be used in the exemplary FIG. 1 embodiment. As shown therein, four power FETs 20, 30, 40, 50 on the input side of FIG. 2b are used to drive a transformer 60 at high frequency. The transformer 60 is in series with a capacitor C 62 and inductor L 61. The power FETs 20, 30, 40, 50 are switched at or near the resonant frequency $f_r$ of this tank circuit $$\left(f_r = \frac{1}{2\pi} \frac{1}{\sqrt{LC}}\right),$$

e.g., at 120 KHz. At the output side of the transformer 60, the high frequency AC voltage is rectified by four diodes 70, 80, 90, 100, as shown in FIG. 2b to produce a 270V DC output.

FIG. 2c shows a slightly different embodiment of a series resonant DC to DC converter for producing a DC output, e.g., of 28 V DC. In FIG. 2c, like components to those in FIG. 2b are shown with the same reference numerals.

A further advantage of using a series resonant DC-DC Converter is that this topology is inherently limited in gain. It cannot create a higher voltage output than determined by the turns ratio Ns/Np of the transformer and its input DC voltage. However, it can be easily regulated to reduce its output voltage to a desired value by controlling the duty cycle of the switching power FETs.

This is in contrast to prior art system that may use a half-bridge LLC converter in a non-regulating mode, without any feedback loop to control the DC/DC converter output voltage. In such prior art, the output voltage may be controlled open loop, by first starting the DC/DC converter at a high frequency, and then reducing the frequency down to the resonant frequency. While this may allow rough soft start, it does not provide a system that can tightly regulate the output voltage or current.

As further detailed herein, in the FIG. 1 exemplary embodiment of the invention, three different feedback loops are provided to ensure that the DC output cannot rise to a damaging level that may endanger the safety of the aircraft. Referring to FIG. 1, Compensator A circuit 12 is part of a first feedback loop that nominally regulates the output voltage of the R-TRU unit by controlling the output voltage of the three phase Vienna Rectifier 2. As shown, it samples the output voltage of the DC/DC Converter 5 at its inputs and is coupled to Vienna Rectifier 2 through PFC Control 29.

As also shown in FIG. 1, Compensator B circuit 7 is part of a second feedback loop that operates to reduce the output voltage of the DC/DC Resonant Converter 5, if necessary. It is coupled to control the DC/DC Resonant Converter 5 through DC/DC Converter Control 6 based on measuring the output of the DC/DC Resonant Converter 5. Finally, Compensator C circuit 14 is part of a third feedback loop that effectively controls the output voltage of the Vienna Rectifier 2 by being coupled to PFC Control 29, which is in turn directly coupled to control the Vienna Rectifier 2.

This three feedback loop architecture prevents the output voltage from rising too high under various fault scenarios and offers fault tolerance to prevent damaging over-voltage conditions from appearing on the DC output.

As described further herein, the Compensator A circuit 12 nominally regulates the output voltage of the Vienna Rectifier 2 during normal operating conditions. As a consequence, Compensator B circuit 7 is not required to regulate the output of the Resonant DC/DC converter 5 for the majority of the time. This allows the Resonant DC/DC Converter 5 to operate in a fully on state. In this configuration, it will provide the highest power conversion efficiency and can be optimized for small size. A highly optimized series resonant converter operates at, or very near, the resonant tank frequency so that all power FETs are operated in a soft switching mode.

Reverting to FIG. 1, DC/DC Converter Control 6 generates the driving waveforms for switching the power FETs in the Resonant DC/DC Converter 5. As discussed further below, in the FIG. 1 embodiment this regulation is achieved by the compensator B circuit 7 which is directly coupled to control the DC/DC Converter Control 6. Compensator B Circuit 7 is part of a feedback loop that controls the DC/DC Converter Control 6 to reduce the output voltage of the Resonant DC/DC Converter 5 by varying the duty cycle of the FETs in the Resonant DC/DC Converter 5. This permits desired regulation of the DC output voltage, while not allowing a deleterious DC over-voltage to be generated.

As mentioned above, during normal operation, the Compensator B circuit 7 operates in a saturated mode. However, the Compensator B circuit 7 will provide output voltage and output current control of the Resonant DC/DC Converter 5 for purposes of soft start and when fault conditions occur as a result of input voltage transients, output overload and output short circuit.

In particular, as shown in FIG. 1, Compensator B circuit 7 samples the output voltage of the Resonant DC/DC Converter 5 at its inputs. If Compensator B circuit 7 senses that this output voltage starts to go too high, then it sends the appropriate signals to DC/DC Converter Control 6 to reduce the voltage output from the Resonant DC/DC Converter 5 by reducing the duty cycle of the switching FETs (e.g., FETs 20, 30, 40, 50 of FIG. 2b) on the input side of the Resonant DC/DC Converter 5.

In an exemplary embodiment, such duty cycle control may be achieved by modulating the relative phase between the signals driving the switching FETs, which in turn will change the duty cycle of the voltage applied to the transformer 60 within the Resonant DC/DC Converter 5. The feedback loop including Compensator B circuit 7 thus acts to prevent a dangerous over-voltage condition at the DC output 26.

As further shown in FIG. 1, a DC/DC Output Voltage Monitor 8 may be optionally provided to monitor the DC output voltage of the Resonant DC/DC Converter 5 and provide a shut-down signal to DC/DC Converter Control 6 that turns off the Resonant DC/DC Converter 5 in the event of an over-voltage fault.

Additionally, a DC/DC Overload Monitor 9 may also be optionally provided that detects the output current being provided to an external load. If the output load current exceeds a maximum value, the DC/DC Overload Monitor 9 will send a signal to the DC/DC Converter Control 6 to shut down and protect the Resonant DC/DC Converter 5 from excessive current draw that may damage its circuitry in the event of an overload or short circuit.

Additional features shown in the exemplary FIG. 1 embodiment include circuit 11, which generates a reference voltage for use in controlling the DC/DC Resonant Converter 5. As shown in FIG. 1, the DC/DC Voltage Reference Generation circuit 11 provides a reference voltage (e.g., 2.5 V) to Compensator B circuit 7 and to the main feedback loop voltage Compensator A circuit 12. The reference voltage is also used to provide a "soft start" condition for the DC/DC Resonant Converter 5. During start up, the DC/DC Voltage Reference Generation circuit 11 causes the reference voltage to ramp up at a controlled rate to reduce excessive in-rush currents and stresses on its power devices that would otherwise occur during the startup phase. For example, the reference voltage may initially be at a low level and will ramp up gradually to, e.g., 2.5 volts, to provide a corresponding gradual turn-on of the Resonant DC/DC Converter 5.

As shown in FIG. 1, the DC/DC Voltage Reference Generation circuit 11 may also be connected to a current sensor 28 to sense an overload current condition. Should this occur, the reference voltage will be reduced to cause the output voltage of the Resonant DC/DC Converter 5 to be "fold backed" to a lower voltage to protect the Resonant DC/DC Converter 5 and prevent damage from an overload condition.

Referring again to FIG. 1, the PFC Control circuit 29 provides switching waveforms that control the power FETs in the 3-phase Vienna Rectifier 2. A PFC Over-voltage Monitor 13 may be optionally provided to monitor the output voltage of the Vienna Rectifier 2 and cause the PFC Control circuit 29 to shut down the Vienna Rectifier 2 if an over-voltage condition occurs.

Significantly, the FIG. 1 exemplary embodiment includes two additional feedback control loops to control the output voltage and prevent an over voltage condition from doing damage. Specifically, Compensator A circuit 12 and Compensator C circuit 14 are each provided in feedback loops that provide feedback to the Vienna Rectifier 2.

Compensator A circuit 12 is the primary feedback loop that regulates the DC output voltage of the Vienna Rectifier 2. As shown in FIG. 1, Compensator A circuit 12 measures the output voltage of the Resonant DC/DC Converter 5, and is arranged as shown to control PFC Control circuit 29 and, in turn, the Vienna Rectifier 2 in the event of an anomalous fault condition, as further discussed below. Since the Resonant DC/DC converter 5 has a maximum voltage gain dictated by the turns ratio of its transformer, the DC/DC Converter Control 6 normally will not regulate the output voltage.

The Compensator C circuit 14 also provides feedback control over the output of the Vienna Rectifier 2 under appropriate conditions. In practice, the voltage regulation point for this Compensator C is set slightly higher than what is required to regulate the DC output. Thus, under normal conditions, it will not regulate the output of the Vienna Rectifier 2. However, Compensator C circuit 14 will be active during failure of the other feedback loops or during startup to regulate the output voltage to Vienna Rectifier 2.

With further reference to FIG. 1, PFC Voltage Reference Generation circuit 16 provides a reference voltage to the Compensator C circuit 14. This is typically a static voltage, but it slowly rises from 0V to the reference potential during startup to provide soft start of the Vienna Rectifier 2.

In the FIG. 1 embodiment, as discussed below, whichever one of Compensators A or C has a lower output voltage will be able to control PFC Control circuit 29, and hence the Vienna Rectifier 2. In this regard, under normal circumstances, the Resonant DC/DC Converter 5 is running at its full output, which results in the highest efficiency conversion.

In particular, as shown in FIG. 1, a pull-up current is injected at point 18. This pull up current, in combination with diodes 20 and 22, permits whichever of the two Compensators A or C has the lowest output voltage to control the PFC Control circuit 29. For example, if one of these compensators, e.g., Compensator C circuit 14, tries to overdrive the Vienna Rectifier 2, by providing a higher voltage to PFC Control circuit 29, then diode 20 at its output, will become reverse biased and prevent the output of the Compensator C circuit 14 from reaching the PFC Control circuit 29. In that event, the Compensator A circuit 12 will be controlling the PFC Control block 29. Likewise, if Compensator A circuit 12 tries to overdrive the Vienna Rectifier 2, its output will reverse bias its corresponding diode 22 and in that event, the Compensator C circuit 14 will control the PFC Control circuit 29.

In addition, the exemplary embodiment of FIG. 1 provides galvanic isolation between input and output. Specifically, such galvanic isolation is provided by the transformer 60 in Resonant DC/DC Converter 5, and by an opto-isolator in isolation amplifier 24.

Further, in the exemplary embodiment of FIG. 1, even if the Compensator A circuit 12 and the Compensator C circuit 14 both failed, causing an increase in the output voltage of the Vienna Rectifier 2 and a corresponding rise in the DC output of the Resonant DC/DC Converter 5, the Compensator B circuit 7 will automatically reduce the output voltage of the Resonant DC/DC Converter 5 to avoid damage that may be caused by an over-voltage appearing at the DC Output 26.

Further, and as noted above, should Compensator B circuit 7 fail, thereby causing the DC/DC Converter Control 6 to push for more voltage at the output of the Resonant DC/DC Converter 5, the turns ratio of its resonant transformer will inherently prevent this from happening.

As disclosed herein, multiple levels of protection are built into the FIG. 1 embodiment to prevent an over-voltage from appearing at the DC output 26, based on the feedback control of the Vienna Rectifier 2 provided by Compensator A circuit 12 and Compensator C circuit 14; the feedback control of the Resonant DC/DC Converter 5 provided by Compensator B circuit 7, and the inherent over-voltage protection provided by the turns ratio of the transformer 60 in the Resonant DC/DC Converter 5.

The Table below shows various potential fault scenarios that may occur in the disclosed system by describing potential single and double fault conditions and the resulting outcome (mitigation). As summarized by this Table, the disclosed embodiment provides over-voltage protection for up to two simultaneous failures without the need for any monitoring circuitry. If an optional DC/DC Output Voltage Monitor 8 and optional PFC Over Voltage Monitor 13 are added (see, FIG. 1) this will increase the number of required failures to three or four before a damaging over-voltage condition could occur. This makes the likelihood of a damaging over-voltage failure extremely low.

| Scenario Number | Failure #1 | Failure #2 | Mitigation |
|---|---|---|---|
| 1 | Compensator A faults and attempts to cause an over voltage of the Vienna Rectifier output. | | Compensator C takes control of the Vienna Rectifier and prevents an output over voltage. |
| 2 | Compensator C faults and attempts to cause an over voltage of the Vienna Rectifier output. | | Compensator A takes control of the Vienna Rectifier and prevents an output over voltage. |
| 3 | Compensator B faults and attempts to cause an over voltage of the Resonant DC/DC Converter output. | | Compensator A takes control of the Vienna Rectifier and prevents an output over voltage. Also, Compensator B can only reduce the output voltage of the Resonant DC/DC Converter, and cannot increase the DC output voltage to a damaging level. |
| 4 | Compensator A faults and attempts to cause an over voltage of the Vienna Rectifier output. | Compensator C faults and attempts to cause an over voltage of the Vienna Rectifier output | Compensator B controls the Resonant DC/DC converter to reduce the output voltage and prevent an over voltage. |
| 5 | Compensator A faults and attempts to cause an over voltage of the Vienna Rectifier output. | Compensator B faults and attempts to cause an over voltage of the Resonant DC/DC Converter output. | Compensator B cannot increase the output voltage of the Resonant DC/DC converter since a series resonant converter cannot increase its output voltage above the transformer turns ratio times the input voltage. The output voltage can only be reduced. In this scenario, Compensator C takes control of the Vienna Rectifier output voltage and prevents an over voltage on the output. |
| 6 | Compensator B faults and attempts to cause an over voltage of the Resonant DC/DC Converter output. | Compensator C faults and attempts to cause an over voltage of the Vienna Rectifier output. | Compensator A takes control of the Vienna Rectifier and prevents an output over voltage. |

Although the disclosed subject matter has been described and illustrated with respect to the exemplary embodiments provided herein, it will be understood by those of ordinary skill in the art that various additions and modifications may be made to these disclosed embodiments without departing from the spirit and scope of the innovations disclosed herein, which are set forth in the following claims.

What is claimed:

1. A power supply system for providing a regulated DC output from an AC input comprising:
    a rectifier for converting said AC input into a rectified DC output,
    a DC to DC converter coupled to said rectifier for providing a regulated DC output,
    a first compensator circuit coupled to monitor the output of said DC to DC converter,
    a second compensator circuit coupled to monitor the output of the rectifier, said first and second compensator circuits each coupled to provide feedback control of said rectifier to prevent an over-voltage at the regulated DC output,
    wherein said second compensator circuit limits the output of the rectifier when a fault occurs in said first compensator circuit.

2. The power supply system of claim 1, wherein said first compensator circuit limits the output of the rectifier when a fault occurs in said second compensator circuit.

3. A power supply system for providing a regulated DC output from an AC input comprising:
    a rectifier for converting said AC input into a rectified DC output,
    a DC to DC converter coupled to said rectifier for providing a regulated DC output,
    a first compensator circuit coupled to monitor the output of said DC to DC converter, a second compensator circuit coupled to monitor the output of the rectifier, said first and second compensator circuits each coupled to provide feedback control of said rectifier to prevent an over-voltage at the regulated DC output, a third compensator circuit to provide feedback control of the DC to DC converter to prevent an over voltage at the regulated DC output, wherein said third compensator circuit limits the regulated DC output in case a fault in the first and second compensator circuits would produce an over voltage at the regulated DC output.

4. The power supply system of claim 3 wherein one of said first, second or third compensator circuits controls the DC output voltage to prevent an over voltage in case a fault in one or more of the other compensator circuits would produce an over voltage at the regulated DC output.

5. A power supply system for providing a regulated DC output from an AC input comprising:
   a Vienna rectifier,
   a series resonant DC to DC converter coupled to said Vienna rectifier for providing a regulated DC output,
   a first compensator circuit coupled to monitor the output of said DC to DC converter,
   a second compensator circuit coupled to monitor the output of the Vienna rectifier, said first and second compensator circuits coupled to provide feedback control of the Vienna rectifier and prevent an over-voltage at the regulated DC output,
   wherein said first compensator circuit limits the output of the rectifier when a fault occurs in said second compensator circuit.

6. The power supply system of claim 5 further including a third compensator circuit to provide feedback control of the DC to DC converter to prevent an over voltage condition at the regulated DC output.

7. The power supply system of claim 6, wherein said third compensator circuit limits the regulated DC output in case a fault in the first and second compensator circuits would produce an over voltage at the regulated DC output.

8. The power supply system of claim 6 wherein one said first, second or third compensator circuits controls the DC output voltage an over voltage in case a fault in one or more of the other compensator circuits would produce an over voltage at the regulated DC output.

* * * * *